United States Patent

Egolf et al.

[15] 3,642,018
[45] Feb. 15, 1972

[54] PNEUMATIC FREQUENCY COMPARATOR AND TRANSDUCER

[72] Inventors: David P. Egolf, Falls Church, Va.; Carl J. Campagnuolo, Potomac, Md.

[73] Assignee: The United States of America as represented by the Secretary of the Army

[22] Filed: June 15, 1970

[21] Appl. No.: 46,361

[52] U.S. Cl. .......................................................... 137/81.5
[51] Int. Cl. ................................................................ F15c 1/08
[58] Field of Search ...................................................... 137/81.5

[56] References Cited

UNITED STATES PATENTS

| | | | |
|---|---|---|---|
| 3,390,692 | 7/1968 | Hastie et al. | 137/81.5 |
| 3,144,037 | 8/1964 | Cargill et al. | 137/81.5 |
| 1,549,196 | 8/1925 | Hall | 137/81.5 X |
| 2,755,767 | 7/1956 | Levavasseur | 137/81.5 UX |
| 2,777,251 | 1/1957 | Bailey | 137/81.5 UX |
| 3,238,958 | 3/1966 | Warren et al. | 137/81.5 |
| 3,311,122 | 3/1967 | Gottron | 137/81.5 |
| 3,556,120 | 1/1971 | Bauer | 137/81.5 |

*Primary Examiner*—Samuel Scott
*Attorney*—Harry M. Saragovitz, Edward J. Kelly, Herbert Berl and J. D. Edgerton

[57] ABSTRACT

A pneumatic frequency comparator and transducer. The preferred embodiment discloses a system which yields a pneumatic readout corresponding to the beat frequency of two acoustic inputs. The acoustic generators presented herein are the electromagnetic-type and the ringtone-oscillator-type. The former provides a pneumatic indication of the beat frequency of two AC electrical input signals and thus may be utilized as an electrical frequency demodulation device or as frequency comparator. The later allows the pneumatic monitoring of the rotational or sliding motion of a machine that is mechanically coupled to the sleeve of the ringtone oscillator which varies the nozzle-to-cavity distance therein to provide a varying frequency acoustic signal for use as an input to the preferred embodiment system.

12 Claims, 3 Drawing Figures

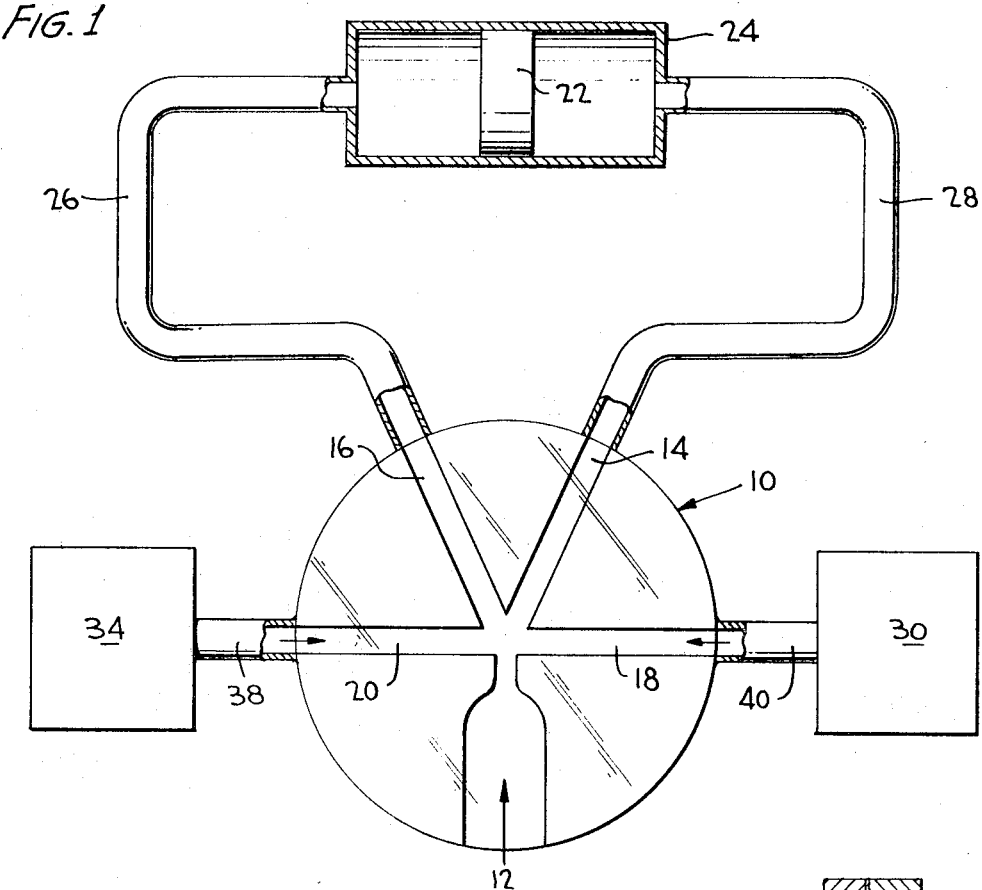
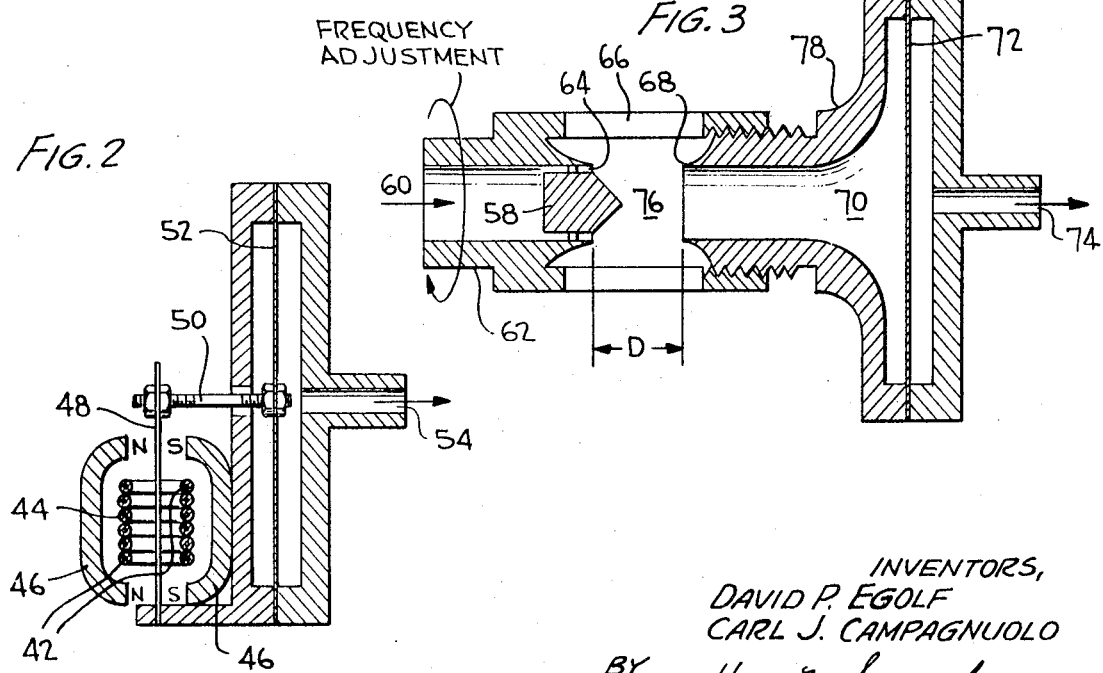

3,642,018

1

PNEUMATIC FREQUENCY COMPARATOR AND TRANSDUCER

RIGHTS OF GOVERNMENT

The invention described herein may be manufactured, used, and licensed by or for the United States Government for governmental purposes without the payment to us of any royalty thereon.

BACKGROUND OF THE INVENTION

This invention relates to fluidic devices and more particularly to pneumatic frequency comparators and electrical-to-fluidic energy transducers. A device had often been sought that has a pneumatic readout that yields information as to the frequency of an incoming electrical or fluidic signal. Additionally, much work has been done to develop a device that monitors the rotational or sliding motion of a machine and which has a direct indication of any variation from the machine's normal motion. Most of the devices thus far developed have relied principally on extremely intricate mechanical linkages and the like to provide direct monitoring of the machine's motion. A more reliable and simpler device in which one can monitor such motions or compare the relative movement of two similarly operating machines would provide a vast improvement over what is presently available in the art.

Accordingly, the primary object of the present invention is to provide a pneumatic position transducer that will effectively monitor a rotational or a sliding motion in a machine.

Another object is to provide a pneumatic frequency comparator that yields a pneumatic output that indicates the beat frequency of two electrical input signals.

An additional object is to provide a pneumatic frequency comparator and transducer that compares the relative motion between two similarly operating machines and provides an indication of the correction needed, if any, to one of the machines.

SUMMARY OF THE INVENTION

Briefly, in accordance with the invention, a pneumatic frequency comparator and transducer is provided that yields a pneumatic readout of the beat frequency of two acoustic signals supplied to the control ports of a bistable fluidic amplifier. The acoustic signals may be provided by any of a number of acoustic generators. One such generator presented herein is the electromagnetic type which transforms an AC electrical input signal into an AC acoustic output signal. By the use of two such generators, an electrical frequency comparator or demodulating transducer is realized. Another acoustic generator presented herein is the ringtone oscillator type that transforms a steady fluid input into an AC acoustic output. The output frequency of the ringtone oscillator can be adjusted by varying the nozzle-to-cavity distance. By mechanically coupling the rotatable sleeve of the ringtone oscillator to a machine, the machine's rotational or sliding motion may be monitored or compared to a standard for correctional purposes.

BRIEF DESCRIPTION OF THE DRAWINGS

The specific nature of the invention as well as other objects, aspects, uses, and advantages thereof will clearly appear from the following description and from the accompanying drawings, in which:

FIG. 1 shows a schematic illustration of a pneumatic frequency comparator and transducer of the present invention;

FIG. 2 is a cutaway side view of an electromagnetic acoustic generator used in a preferred embodiment of the present invention; and FIG. 3 is a cutaway side view of a ringtone oscillator for use as an acoustic generator in a second preferred embodiment of the present invention.

DESCRIPTION OF THE PREFERRED EMBODIMENTS

FIG. 1 shows a standard bistable or flip-flop fluidic amplifier at 10 that employs a fluid jet forming nozzle 12, a pair of fluid receiving channels 14 and 16 downstream from jet nozzle 12, and a pair of oppositely diverging control channels 18 and 20 located intermediate the output channels 14 and 16 and power jet nozzle 12 onto which the power jet can lock. The position of the power jet, i.e., the channel to which it is locked, is indicative of the condition of the device, and is responsive to an input information signal along control channels 18 and 20. In accordance with the teachings of this invention, the position of the fluid jet is controlled by means of acoustic signals applied along control channels 18 and 20. In the standard bistable operation of amplifier 10, as taught in U.S. Pat. No. 3,311,122 to Gottron, assuming the power jet from nozzle 12 is initially locked on to output channel 14, an acoustic signal developed by acoustic generator 30 and conducted by acoustic transmission medium 40 causes the power jet to become detached from output channel 14, switch, and become attached to output channel 16. Similarly, with the power jet attached to output channel 16, an acoustic signal developed by acoustic generator 34 causes the power jet to become detached from output channel 16, switch, and become attached to output channel 14.

We have discovered that a standard bistable fluidic amplifier such as shown at 10 can be caused to oscillate at the beat frequency between two acoustic generators, one attached to either control channel of the amplifier, as shown in FIG. 1. Thus the fluid issuing from output channels 14 and 16 along conduits 28 and 26, respectively, will cause an indicating device such as the piston 22, located within a cylindrical cavity 24, to oscillate at a frequency which is the difference in frequencies of the acoustic signals issuing from acoustic generators 30 and 34. For example, if acoustic generator 30 is generating a signal at 1,000 Hz. and acoustic generator 34 is generating a signal of equal amplitude at 1,050 Hz., piston 22, being of a suitable mass, will oscillate at a frequency of 50 Hz.

In accordance with the present invention, acoustic generators 30 and 34 can be of a number of well-known acoustic generators, such as the electromagnetic type or the ringtone oscillator type as presented hereinafter. If acoustic generators 30 and 34 are of the electromagnetic type, and if a sinusoidal electrical signal of known frequency is applied to one acoustic generator and a sinusoidal signal of an unknown frequency to the other, amplifier 10 will yield a sinusoidal pneumatic output with a frequency identical to the beat frequency between the two electrical inputs. From this, the frequency of the unknown signal may be determined. Alternatively, if the acoustic generators 30 and 34 are of the ringtone or wedgetone oscillator type, then the DC input to the oscillators is transformed to an AC pneumatic output by amplifier 10, according to the frequency difference of the acoustic output signals from generators 30 and 34.

FIG. 2 shows an electromagnetic acoustic generator that transforms an AC electrical signal received along input lines 42 into an AC acoustic output signal along output port 54. A coil 44 situated in a permanent magnetic field set up by magnet pieces 46 receives an AC electrical input signal from lines 42. A ferromagnetic reed 48 located within coil 44 vibrates in response to the AC electrical signal that disturbs the magnetic field therearound. A diaphragm 52 located adjacent to output port 54 is connected to reed 48 by a shaft 50. The vibrations of reed 48 drive diaphragm 52 into oscillation, thus setting the air adjacent to output port 54 in motion thereby creating an AC acoustic signal identical in frequency to the input electrical signal. If two of these generators are positioned one at each control channel 18 and 20 of amplifier 10 of FIG. 1, then the power jet is caused to alternate between output channels 14 and 16 at the beat frequency of the two AC electrical input signals. If the frequencies of the generators are exactly the same, no oscillation of the amplifier results. This device can be utilized as an electrical frequency comparator with a pneumatic readout. In this manner a frequency modulated electrical signal may be demodulated and transduced to a pneumatic signal in one single step.

FIG. 3 shows a ringtone oscillator with adjustable frequency that can be used as acoustic generators 30 and 34 of FIG. 1. In FIG. 3, fluid power for the generator enters a port 60 formed by a sleeve 62. Downstream from port 60 is a cylindrical plug 58 centrally located therein that forms an annular nozzle 64, beyond which is an entrance chamber 76 formed by sleeve 62 which has openings 66 therein for exhaust purposes. Entrance chamber 76 leads to an opening 68 in a resonant cavity 70 whose other end is enclosed by a diaphragm 72. In operation, air, which is the source of power, enters the generator at port 60, and is converted by annular nozzle 64 into an annular column of air which proceeds into entrance chamber 76. Annular nozzle 64 is of a slightly smaller diameter than opening 68, but the columns of air emanating from nozzle 64 will tend to spread and impinge upon the edge of opening 68. The impinging of the air on this edge, in the well-known manner, will produce a multiple-frequency edgetone or ringtone. The oscillation of the annular column of air back and forth across the end of opening 68 will cause the column of air in the resonant cavity 70 to vibrate, with the frequency of that vibration being determined by the dimensions of cavity 70 and entrance chamber 76. The vibration of air in cavity 70 will in turn cause diaphragm 72 to pulsate inwardly and outwardly. These pulsations create an AC acoustic output signal through port 74. The excess air is exhausted to the atmosphere through vents 66.

We have discovered that by changing the nozzle-to-cavity distance D of a ringtone oscillator, the output frequency of the AC acoustic signal changes accordingly. Hence, if two ringtone-type acoustic generators such as described herein are placed at each control port 18 and 20 of amplifier 10 of FIG. 1 and the frequency of one or both of the generators is varied by adjusting the nozzle-to-cavity distance D, then the beat frequency is varied, thus varying the frequency of the AC pneumatic output of amplifier 10. The nozzle-to-cavity distance D can be varied by unscrewing the sleeve 62 from the body 78 of the oscillator as shown in FIG. 3. Thus, if sleeve is mechanically connected to a machine having a rotational motion, such a motion can be monitored simply by utilizing the system of FIG. 1. Any rotational motion applied to one of the generators causes the beat frequency at the output of amplifier 10 to change in relation to that rotational motion. Alternatively, sleeve 62 may be attached to body 78 in a manner such that a sliding motion in the direction of the center axis of the generator may be monitored. By the methods presented herein, the frequency of oscillation of amplifier 10, demonstrated by piston 22, may be varied over a wide range by rotating or sliding sleeve 62 of one or both ringtone oscillators. The frequency of oscillation is limited only by the maximum switching speed of amplifier 10. This system can be used to measure any rotation or sliding motion in a machine and convert such a motion into an AC pneumatic output.

We wish it to be understood that we do not desire to be limited to the exact details of construction shown and described, for obvious modifications will occur to a person skilled in the art.

We claim as our invention:

1. A pneumatic frequency comparator and transducer, comprising:
  a. a bistable fluidic amplifier having an input port, first and second output channels, and first and second control channels;
  b. first and second acoustic generators connected to said first and second control channels, respectively, said first acoustic generator generating a first signal at a first frequency and said second acoustic generator generating a second signal at a second frequency, said second signal having the same amplitude as said first signal, causing the fluid issuing from said amplifier to alternate between said first and second output channels of said amplifier at a third frequency or beat frequency of said acoustic generators, said third or beat frequency being the difference in frequencies between said first frequency and said second frequency; and
  c. means connected to said first and second output channels of said amplifier for indicating said beat frequency.

2. The invention according to claim 1 wherein said first and second acoustic generators are of the electromagnetic type each having an AC electrical input and an AC acoustic output whereby the frequency difference between said AC electrical signals is indicated by said indicating means.

3. The invention according to claim 2 wherein said electromagnetic acoustic generators each comprise:
  a. an output port;
  b. a coil situated in a permanent magnetic field to receive said AC electrical input signal;
  c. a ferromagnetic reed located within said coil which vibrates in response to said AC electrical input signal within said coil; and
  d. a diaphragm located adjacent to said output port and connected to said reed by a shaft, said diaphragm being driven by said reed into vibration thus setting the fluid adjacent to said output port in motion whereby an AC acoustic signal issues from said output port.

4. The invention according to claim 3 wherein said indicating means comprises a movable piston located within a cylindrical cavity, the opposite ends of said cavity each connected to one of said output channels of said amplifier wherein said piston oscillates at the switching frequency of said amplifier.

5. The invention according to claim 1 wherein said first and second acoustic generators are ringtone oscillators each having a DC pneumatic fluid input and an AC acoustic output.

6. The invention according to claim 5 wherein said ringtone oscillators each comprise:
  a. an output port;
  b. a main channel for providing said DC pneumatic fluid input;
  c. an entrance chamber leading to an enclosed volume having an open end and a closed end and defining a resonant cavity;
  d. an annular nozzle for receiving said DC pneumatic fluid input, transforming said fluid into an annular column and directing said annular column of fluid through said entrance chamber directly into and so as to impinge upon an edge of said open end of said enclosed volume so as to produce a multiple frequency ringtone thereby causing the fluid in said enclosed volume to vibrate at a particular frequency;
  e. a diaphragm located adjacent to said output port and forming said closed end of said enclosed volume for sensing the fluid vibrations therein and thus setting the fluid adjacent to said output port in motion whereby and AC acoustic signal issues from said output port; and
  f. means for varying the frequency of said acoustic output signal.

7. The invention according to claim 6 wherein said frequency varying means comprises means for adjusting the nozzle-to-cavity distance, one particular position of which establishes said particular frequency.

8. The invention according to claim 7 wherein said indicating means comprises a movable piston located within a cylindrical cavity, the opposite ends of said cavity each connected to one of said output channels of said amplifier wherein said piston oscillates at the switching frequency of said amplifier.

9. The invention according to claim 7 wherein said means for adjusting the nozzle-to-cavity distance comprises a sleeve whose position is rotatable relative to said resonant cavity.

10. The invention according to claim 9 wherein said sleeve forms said entrance chamber and encloses said annular nozzle.

11. The invention according to claim 7 wherein said means for adjusting the nozzle-to-cavity distance comprises a sleeve whose position is slidable relative to said resonant cavity.

12. The invention according to claim 11 wherein said sleeve forms said entrance chamber and encloses said annular nozzle.